T. B. ATTERBURY.
COMBINED LAMP CHIMNEY AND SHADE.

No. 176,160. Patented April 18, 1876.

Witnesses.
James Martin Jr.
J. N. Campbell

Inventor.
Thomas B. Atterbury
by
Mason, Fenwick & Lawrence
Attys.

UNITED STATES PATENT OFFICE.

THOMAS B. ATTERBURY, OF PITTSBURG, PENNSYLVANIA, ASSIGNOR TO HIMSELF AND JAMES S. ATTERBURY, OF SAME PLACE.

IMPROVEMENT IN COMBINED LAMP CHIMNEYS AND SHADES.

Specification forming part of Letters Patent No. 176,160, dated April 18, 1876; application filed June 7, 1875.

*To all whom it may concern:*

Be it known that I, THOMAS B. ATTERBURY, of Pittsburg, county of Allegheny and State of Pennsylvania, have invented a new and useful Combined Glass Lamp Chimney and Shade; and I do hereby declare that the following is a full, clear, and exact description thereof, reference being had to the accompanying drawings, making part of this specification, in which—

Figure 3:
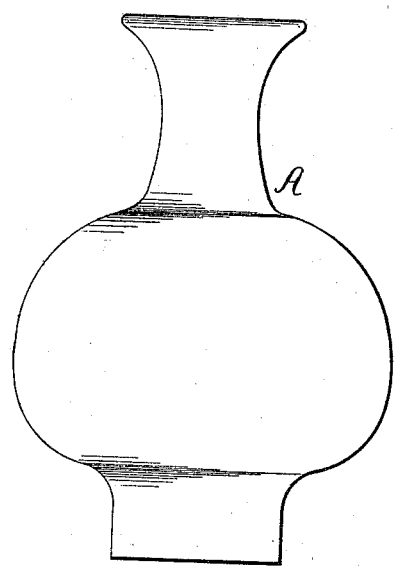
Figure 1:
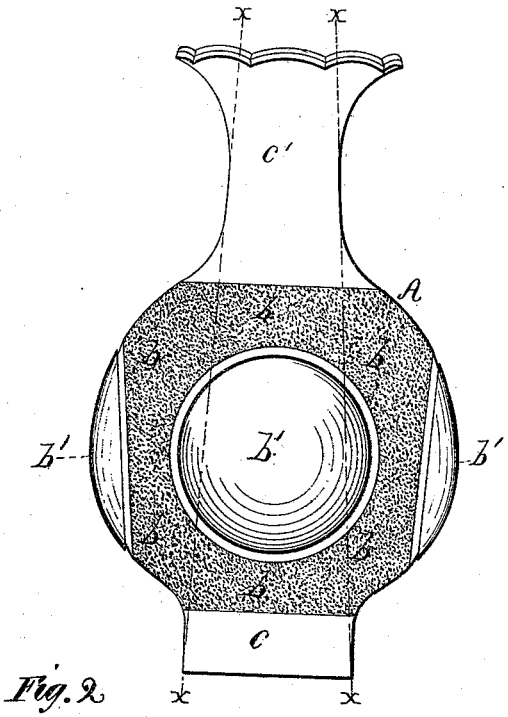
Figure 2:
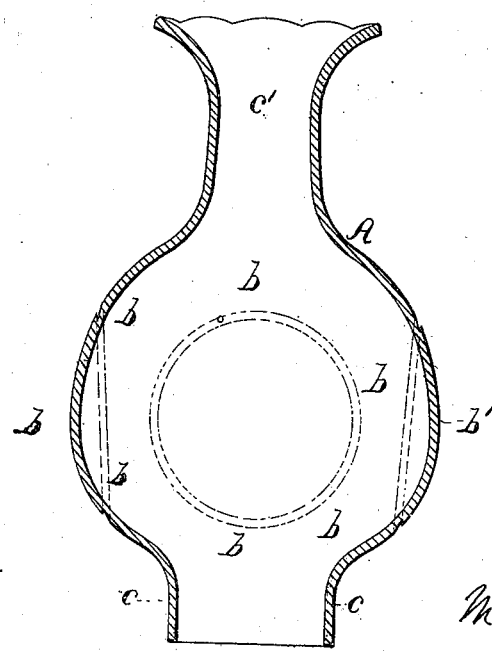

Figure 1 is an elevation of my lamp chimney and shade combined; Fig. 2, a vertical longitudinal section of Fig. 1; and Fig. 3, an elevation of a lamp chimney and shade combined, with the glass composing it left clear, no portion of it being "ground," as shown in Fig. 1.

Heretofore a serious objection to the use of lamps and carbon oil has existed, owing to the immense breakage of lamp-chimneys. This breakage is caused by the fact that the "light" or heat of the flame is in close proximity with the chimney, thus causing the chimney to become very hot, so that a sudden draft of air coming in contact with the heated chimney causes it to quickly and unequally contract, and hence break.

A still further objection to the use of the ordinary lamp-chimneys is the fact that they easily become "smoked," and so frequently require internal cleaning, the process of doing which often results in the breakage of the chimney.

By my construction no breakage can occur from the heat of the flame, as the distance from the heat to the glass is so great that the glass is always kept comparatively cool, which distance between the flame and the glass also protects the glass from becoming foul with soot.

In the drawing, A indicates my lamp chimney and shade, combined in one piece of glass. It is constructed with an expanded tube, as at $b$, with a projection, $c$, at its base, in the form of the base portion of an ordinary glass chimney, and with a contracted neck, as at $c'$, above the expanded tube $b$. This chimney-extension $c$ is, in the present instance, of a diameter suitable to be used in connection with a lamp having a "sun-burner," but can as well be used with any other of the well-known styles of "burners," by making said bottom portion $c$ to fit them.

By this construction it will be seen that when my lamp chimney and shade is placed upon a burner, the flame of the burner will project up into the tube or bowl $b$ such a distance as to be free from liability to overheat the glass, while at the same time the contracted portion $c$, which will rest upon the burner-frame, will insure an upward draft of air around the flame to promote combustion, upon the Argand principle pertaining to the use of the ordinary glass chimneys.

The contracted neck $c'$ above the expanded tube or bowl portion $b$ also serves the same function for draft as in the ordinary lamp-chimney, while a more perfect combustion of the flame is promoted by the presence of a greater volume of air in the bowl $b$ around the flame than is the case where the ordinary chimneys are used.

The outline of draft of my lamp chimney and shade combined may be signified by the dotted lines $x$ $x$ of Fig. 1, the contracted neck $c'$ and chimney-base $c$ serving the functions of such parts of the ordinary glass chimney, while the air-space between them completes their connection without a direct intermediate use of glass material, thereby securing the advantages above set forth. In fact, I have found that the neck $c'$ being small, and the bulb $b$ being large, creates a greater draft than the ordinary chimney, thereby giving a much better combustion and light.

In Figs. 1 and 2 I have shown circular "concaves," as at $b'$, which concaves are clear or plain, while the balance of the expanded tube or bowl $b$ is frosted, as indicated in Fig. 1. A handsome effect is thus produced when the light is burning within; but this feature forms no part of my present invention.

Having thus described my invention, what I claim as new, and desire to secure by Letters Patent, is—

The globe-shaped shade or bowl, with a chimney at its top, and a neck at its base, the whole constructed of glass and in one piece, and taking the place on a lamp of the ordinary chimney, and serving the purposes of the ordinary globe and chimney which are made in separate parts, substantially as described.

Witness my hand in the matter of my application for a patent on a glass lamp chimney and shade combined.

THOS. B. ATTERBURY.

Witnesses:
B. E. KRUGH,
GEO. CHAMBERS.